Jan. 3, 1956   W. C. FOSTER   2,729,584
METHOD AND APPARATUS FOR THE MANUFACTURE
OF A COMPOSITE WOOD PRODUCT
Filed July 20, 1949   4 Sheets-Sheet 3
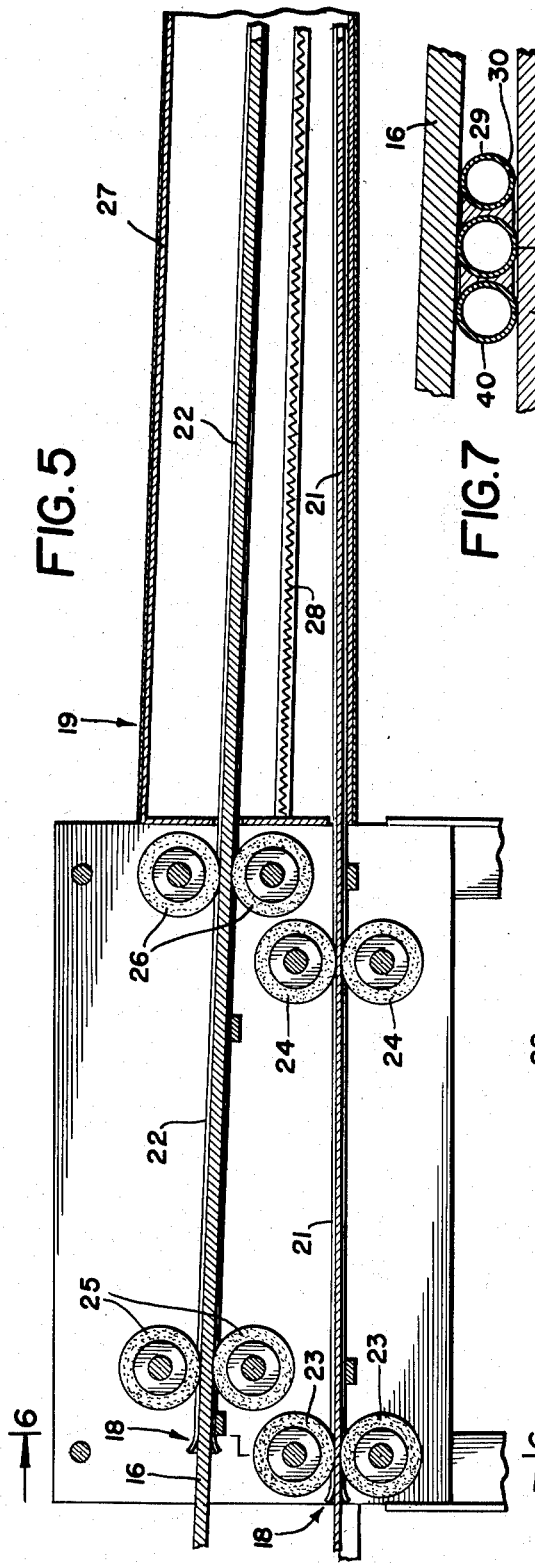
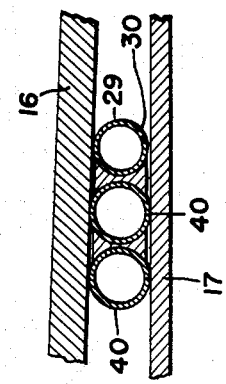
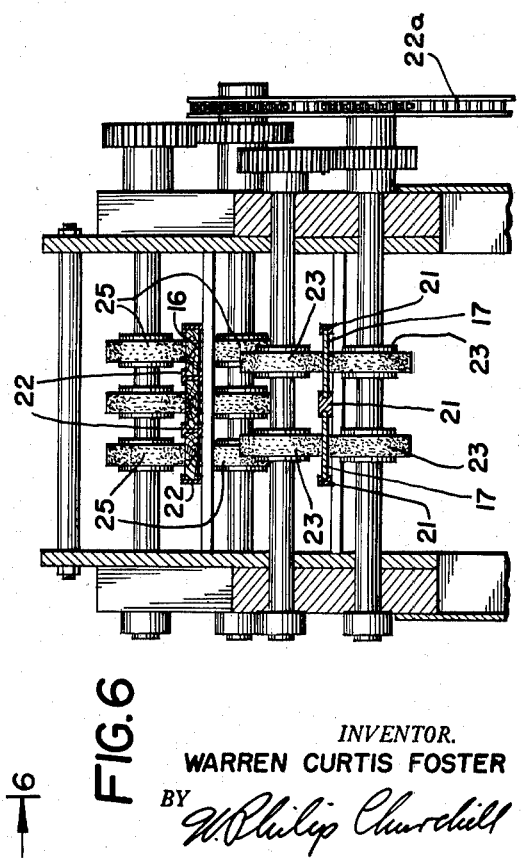
INVENTOR.
WARREN CURTIS FOSTER
BY
ATTORNEY.

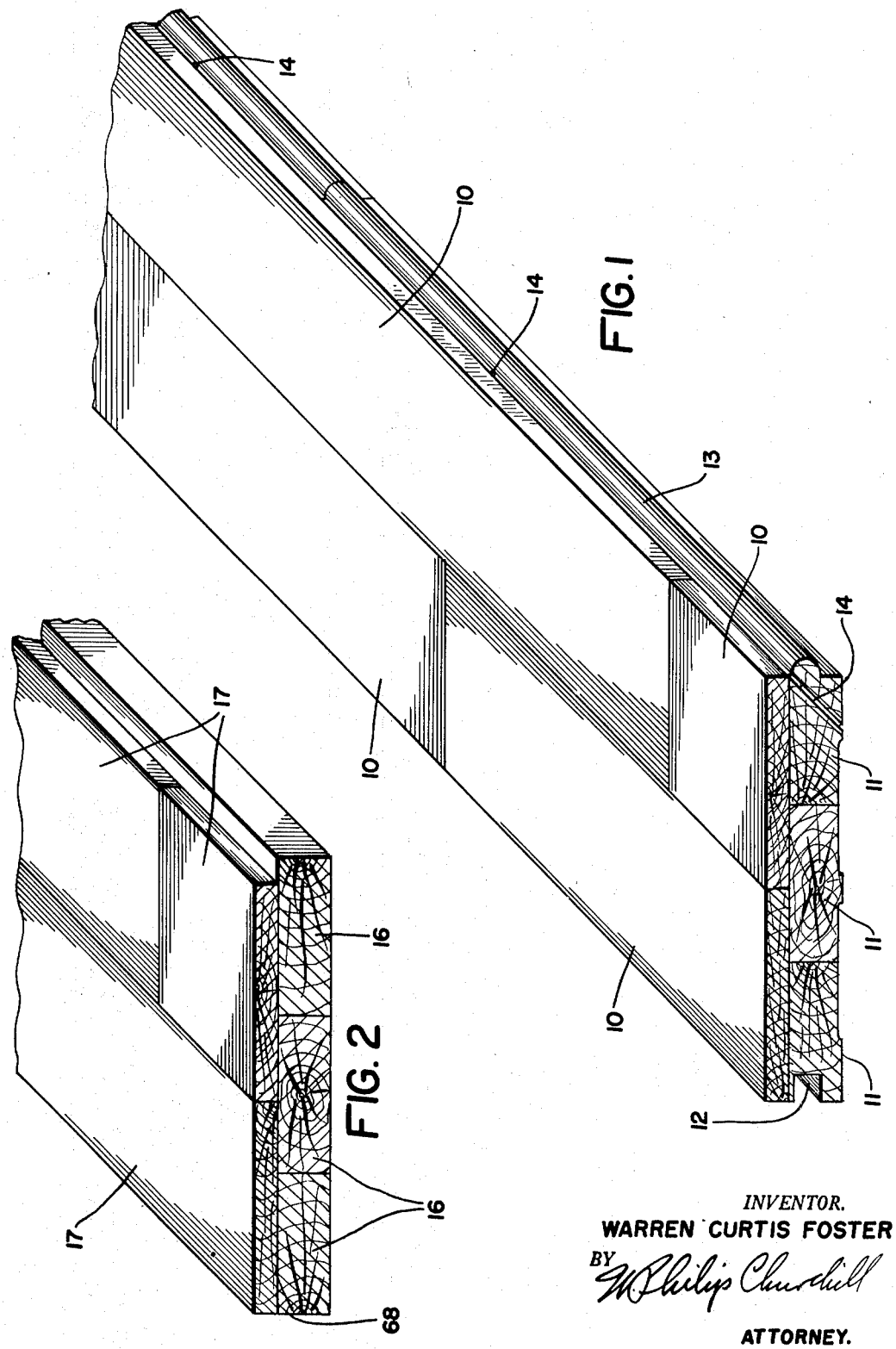

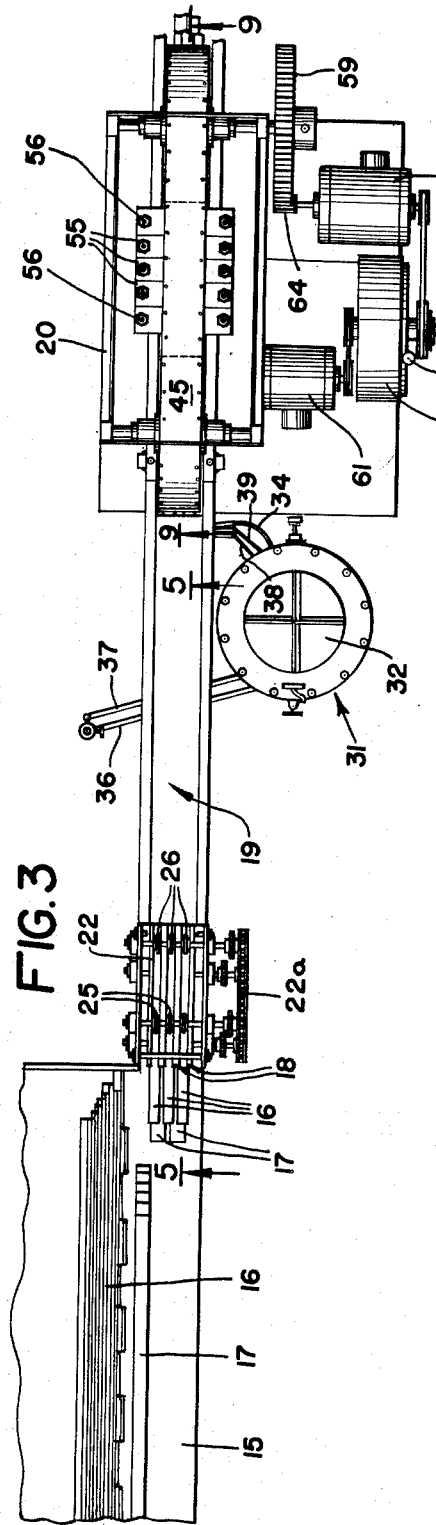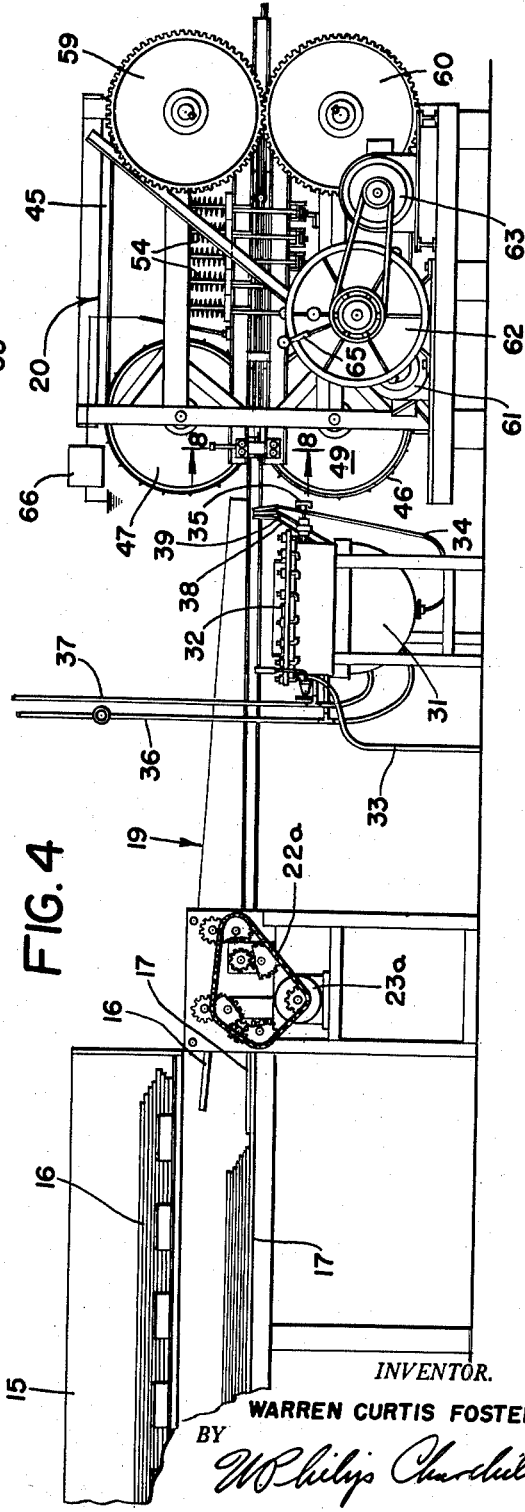

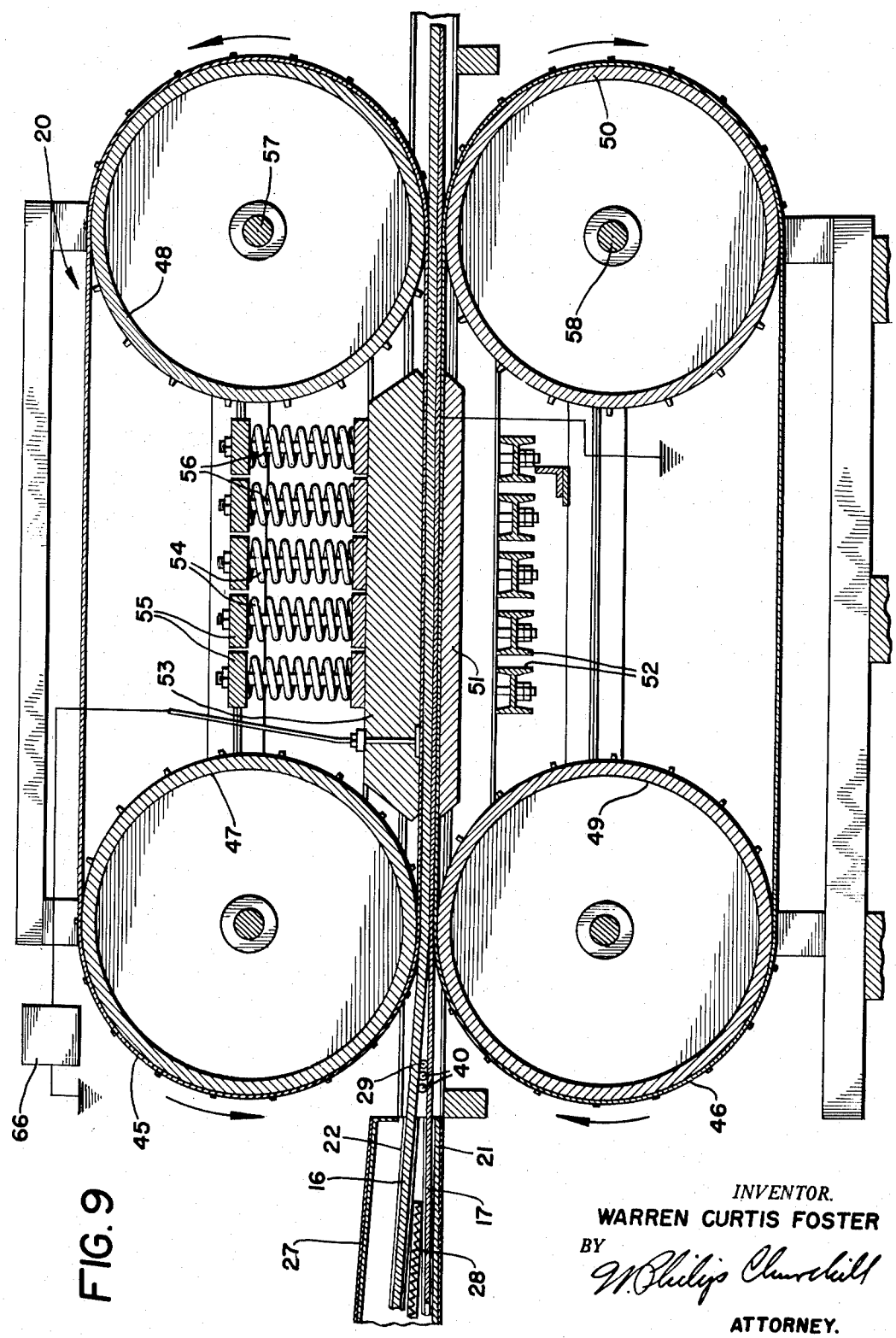

United States Patent Office 2,729,584
Patented Jan. 3, 1956

2,729,584

METHOD AND APPARATUS FOR THE MANUFACTURE OF A COMPOSITE WOOD PRODUCT

Warren Curtis Foster, Wentworth, N. H., assignor, by mesne assignments, to The Crandall Corporation, Wentworth, N. H., a corporation of Delaware Application July 20, 1949, Serial No. 105,765

18 Claims. (Cl. 154—116)

This invention relates to composite or laminated wood structures, and more particularly to composite flooring, together with a method and apparatus for manufacturing such product.

Conventional hard wood flooring has been much in demand for a great many years, in spite of the fact that as seasoned hard wood becomes more scare and labor costs increase, it becomes more and more difficult and expensive to obtain and lay such flooring. The laying of the floor itself is not easy since the strips are ordinarily quite narrow and the nails must be driven at a slant into the edge of the flooring to keep them from showing on the surface of the laid floor.

An object of my invention is to provide a composite laminated wooden product which for all practical purposes produces a laid floor equal to an ordinary hard wood floor but which is less expensive to produce and easier to lay.

A further object of my invention is to provide a method and apparatus for manufacturing composite flooring in any desired lengths.

A further object of the invention is the provision of a method and apparatus for producing continuously and rapidly a laminated wood product which is continuously and automatically assembled and glued together under heat and pressure.

Other objects and advantages of the invention will be explained or will be apparent from the following description of a wood flooring product and the manufacture thereof embodying my invention.

In the drawings,

Figure 1 is a perspective view of a finished strip of composite flooring manufactured according to my invention;

Figure 2 is a perspective view of such a composite strip of flooring as it emerges from the gluing press and before it is trimmed and grooved;

Figure 3 is a plan view of apparatus for assembling and gluing strips of wood together to form a laminated flooring product according to my invention;

Figure 4 is a side elevational view of the apparatus as shown in Figure 3;

Figure 5 is a longitudinally sectional view, taken approximately on the line 5—5 of Figure 3, and showing on a larger scale the feeding and assembling portion of the apparatus;

Figure 6 is a transverse sectional view, taken approximately on the line 6—6 of Figure 5;

Figure 7 is a fragmentary longitudinal sectional view on a larger scale showing the glue spreader which applies glue to the surfaces of the wood strips just before they enter the press;

Figure 8 is a transverse sectional view of the apparatus, taken approximately on the line 8—8 of Figure 4; and Figure 9 is a longitudinal sectional view, taken approximately on the line 9—9 of Figure 3, and showing the press portion of the apparatus on a somewhat larger scale.

The composite flooring of my invention is shown in finished form in Figure 1, and may consist of a series of strips 10 of a suitable hard wood such as oak laid end to end and side by side on top of a number of thicker strips 11 of a soft wood such as pine. Other varieties of hard and soft woods may, of course, be used. For example, the hard wood strips 10 may be cut the same width as ordinary hard wood flooring, which is ordinarily 2¼", but instead of being the usual thickness may be cut in much thinner pieces, for example pieces which are approximately ¼" thick. These hard wood strips are preferably firmly bonded to a base or supporting layer of soft wood formed by the strips 11, which may be of sufficient thickness to provide a composite strip that is approximately ¾" or any other suitable standard overall thickness. The hard wood surface strips 10 and the soft wood base or supporting strips 11 are preferably so arranged that end and side joints of the underlying soft wood strips do not coincide at any point with the junction lines of the surface hard wood strips 10. The whole structure is preferably held securely together as one unitary piece by suitable adhesive, such as a high strength resin glue.

On one side of the composite strip a longitudinal groove 12 may be formed which is preferably cut into the soft wood and on the opposite side a complemental tongue 13 may be formed, also of soft wood. If desired, diagonal or slanting nail holes 14 may be provided through the soft wood at any suitable intervals along the composite strip.

It will be apparent that while the composite strip illustrated in Figure 1 is equal in width to two ordinary strips of hard wood flooring, this composite strip may be made with three or more such hard wood strips on the surface if desired. By having surface and base strips overlapping each other as described, the composite flooring strip illustrated in Figure 1 may be made as one continuous piece similar to an extruded rod, and may be cut into any desired lengths. Such a flooring, of course, is very simple to lay since the nails are put through the soft wood instead of the hard wood and the pieces to be laid are at least twice the usual width of flooring which materially reduces the time of laying. On the other hand, the completed floor is to all intents and purposes exactly like a conventional hard wood floor and the hard wood surface, even though only a ¼" thick, provides ample hard wood surface for all ordinary kinds of wear.

Referring now to the apparatus for producing this material illustrated in Figures 3 to 9, bin 15 is provided for holding separate from each other a supply of soft wood strips 16 and a supply of hard wood strips 17 which previously have been properly cured and cut to the desired size. These strips of wood are fed by hand into guides, indicated generally at 18, and are then moved through the assembling portion 19 of the machine where they are gradually brought together in the proper relationship, have glue applied to their inner surfaces, and are then joined together under heat and pressure on the press portion of the machine, indicated generally at 20. The guides 18 may consist of the lower fixed flanged guides 21, best seen in Figure 6, which are designed to receive between them and hold side by side in spaced relation from each other a pair of the hard wood strips 17. Some distance above the guides there is a second set of fixed flanged guides 22 which are inclined to the horizontal so as to bring the strips passing between them gradually closer to the strips between the guides 21. The guides 22 are designed to receive and handle three of the soft wood strips 16 in side by side relation. The wood strips themselves, after being introduced by hand between the guides, are advanced longitudinally by positively driven friction wheels. For example, two pairs of cooperating rubber-tired wheels 23 may be disposed adjacent the feed end of the guides 21, and as the strips advance they are also held by and advanced by two additional pairs of feed wheels 24 (see Figs. 5 and 6). The soft wood strips 16 may be advanced by similar pairs of rubber-tired feed wheels 25 which have a frictional engagement with the wood and which are thereafter assisted by additional pairs of feed wheels 26.

These various friction feed wheels may be appropriately mounted on shafts carrying at one end a set of gears and sprocket wheels so that they can be positively driven through the chain 22a by the motor 23a (see Figs. 3 and 4).

As previously mentioned, it is desirable to feed the soft wood strips 16 and the hard wood strips 17 into the guides 22 and 21, respectively, in a staggered fashion so that the butt or end joints of these different strips all come at different places and do not coincide with each other. As the various strips are advanced between the guides 21 and 22 they are gradually brought closer together and are moved during this period through a chamber formed by the housing 27. The strips during this time are spaced from each other not only vertically but also laterally. To facilitate the subsequent gluing and pressing operation, the internal faces or surfaces of these strips which ultimately are to be brought together are preferably heated during their passage through this chamber by a suitable heating element, such as the electrical resistance units 28, disposed between the guides 22 and 21.

As the strips come closer together and approach the press portion of the machine, a suitable adhesive or glue is applied to their inner surfaces. A particularly satisfactory way to accomplish this is by supplying glue under pressure to a suitable spreader such as the perforated tube 29 located just beyond the end of housing 27 and disposed between the strips 16 and 17. Suitably spaced perforations 30, both in the upper and in the lower portion of the tube 29, may be used for distributing the glue properly over the surfaces of the wood (see Fig. 7).

I prefer to use a resin glue such as a urea-formaldehyde glue which is cured or hardened under the influence of heat and pressure. Such a glue, with the catalyst or curing agent added to it, may be placed in a jacketed kettle 31 which is properly sealed by a lid 32 clamped in place. Air under pressure may then be supplied to the interior of the kettle through pipe 33 to force the glue out of the bottom of the kettle through the line 34 to the tube 29. By using a spreader tube 29 which is capped at one end, the glue is thus forced under pressure out through the perforations 30 and the flow of the glue can be easily regulated by the valve 35 in the line 34.

Since resin glues of this kind frequently generate heat spontaneously after the curing agent or catalyst is added to them, and since they are converted to a hard and infusible mass under the influence of heat and pressure, I prefer to circulate cooling water through the jacket of the kettle to keep the glue cool prior to the time it is actually spread on the wood surface. For this purpose cold water is supplied to the jacket through the line 36, the cooling liquid being withdrawn through the line 37. Branch lines 38 and 39 are connected to the water circulating pipes 36 and 37 so as to bring the cooling liquid around through the U-shaped tube 40 which is disposed with its branches in heat-exchange relationship with the glue distributing tube 29. Thus, the glue is maintained cool up to the time that it is actually spread on the heated surface of the wood strips 17 and 16.

Referring now more particularly to Figures 8 and 9, the wood strips are brought together vertically immediately after having the glue spread over their inner surfaces. Simultaneously, these strips are moved together laterally by the rollers 41 and 42 mounted on each side of the wood strips at a point just after the strips leave the guides 22 and 21 and just before they pass into the press. Roller 41 is preferably mounted on a shaft in fixed bearings so that the strips of both hard wood and soft wood both have their side edges held flush against the smooth face of this roller. Roller 42 may be spring loaded or otherwise pressed against the side of the strips, and may have a flexible or irregular surface corresponding to the relative widths and thicknesses of the hard and soft wood strips to force these strips laterally together and against the smooth face of roller 41.

The press (see Figures 3, 4 and 9) consists essentially of a pair of endless steel bands 45 and 46 arranged to advance the composite wooden structure and to hold it together under pressure at the same time. For this purpose, steel band 45 may pass around a pair of large wheels 47 and 48 carrying sprockets that fit through perforations along the margin of the band, while the band 46 is carried in a similar manner by the sprocket wheels 49 and 50. For reasons which will appear, the wheels 47 and 48, at least, are preferably made of bakelite or other suitable electrical insulating material. Between the sprocket wheels the band 46 passes over a fixed pad 51 which is preferably internally heated and which may be supported on the I-beams 52 or similar structural members. Disposed above the center of band 45 is a similar pressure pad 53, preferably made of bakelite or other suitable insulating material, and which also may be internally heated by electricity or other means.

Any suitable amount of loading pressure may be applied to the pad 53 by means of the compression springs 54 which are arranged so that their lower ends bear on the pressure pad 53. Their upper ends are held by the tie bars 55 connected at their ends by bolts 56 to the lower or supporting I-beams 52. Thus, by tightening the nuts on the bolts 56, the amount of pressure applied by the springs 54 to the pressure pad 53 can be increased to any desired extent.

In order to positively advance the composite wood product through the press while it is being subjected to the pressure of the pads 53 and 51 acting through the bands 45 and 46, the sprocket wheels 48 and 50 may be mounted on shafts 57 and 58, which are positively driven through the large meshing gears 59 and 60 keyed on the ends of the shafts. One of these gears 60 may be positively driven by means of the motor 61 acting through the variable speed control unit 62 and the gear reduction unit 63 which has a small pinion gear 64 meshing with the gear 60. Lever 65 may be used to adjust the speed of the drive and thus vary the speed at which the wood strips are moved through the entire machine.

To provide additional heating and thus ensure curing of the resin glue while the wood strips are under pressure, the bands 45 and 46 may be connected to a suitable high frequency generator or oscillator so that the bands 45 and 46 act as the plates of a condenser with the wood strips and glue between them serving as the dielectric of the condenser. It is for this reason that the wheels 47 and 48 and the pressure pad 53 are made of electrically insulating material. The wheels 49 and 50 and pad 51 may be made of metal since the band 46 will be at ground potential. Any suitable high frequency generator, such as illustrated schematically at 66, may be used, as will be understood by those skilled in the art.

From the foregoing description it will be seen that in accordance with my invention, the wood strips are fed in overlapping relation and gradually brought together. However, the inner surfaces of these strips are heated during this assembling to a fairly high temperature, and glue supplied under pressure through a water cooled system is spread on these heated inner surfaces of the strips just before they are brought together and go into the press. The heat may then be maintained by means of the dielectric heating produced by the high frequency generator, and by the heated pressure pads 51 and 53 while the wood is in the press so that this preheating and maintaining of the curing heat makes it possible to cure the glue in a relatively short pressing time.

As the product emerges from the press it is one long continuous composite strip, as seen in Fig. 2, the hard wood strips 17 and the soft wood strips 16 being flush on one side as shown at 68. At the other side of the composite strip one of the soft wood strips 16 preferably projects laterally beyond the side of the hard wood strip 17. A groove 12 may thus be easily cut in the flush side of the composite product, while soft wood projecting from the other side of the composite strip can easily be trimmed to form the tongue 13. Such trimming or cutting operations after the composite strip is formed will be confined, of course, to the soft wood and thus be relatively easy to perform.

The product of my invention may be made with wood strips which are simply rough sawn but if desired the thin hard wood strips may be finished in any suitable fashion before being assembled and passed through the machine. For example, the top surface of the hard wood strips may be planed or, if desired, may even be sanded and varnished before being assembled with the soft wood into the composite flooring. It is thus possible, according to this invention, to produce composite flooring which only has to be laid in order to produce a finished hard wood floor.

The terms and expressions which I have employed are used as terms of description and not of limitation, and I have no intention, in the use of such terms and expressions, of excluding any equivalent of the features shown and described or portions thereof, but recognize that various modifications are possible within the scope of the invention claimed.

I claim:

1. A method of producing a composite wood product which comprises feeding in a longitudinal direction a plurality of thin strips of hard wood, simultaneously feeding in superposed spaced relation thereto a plurality of strips of supporting wood, bringing the strips gradually into contact with each other to form a laminated product, heating adjacent surfaces of the strips as they are so guided, applying thermosetting resin glue to the heated surfaces just before they come together, and immediately thereafter applying heat and pressure to bond the strips together.

2. A method as defined in claim 1 in which the supporting and hard wood strips are fed in staggered overlapping sequence to produce one long continuous composite product.

3. Apparatus for manufacturing composite flooring which comprises means for feeding longitudinally a plurality of strips of hard wood, means for feeding longitudinally in superposed relation thereto a plurality of strips of supporting wood, means for guiding said strips along a converging path into contact with each other, means for applying thermo-setting glue to the inner surfaces of said strips immediately before they come together, means for heating the surfaces of said strips before the glue is applied thereto, and means for pressing the glued strips together under heat and pressure.

4. Apparatus as defined in claim 3 in which the glue applying means comprises a perforated tube for delivering the glue under pressure to the surfaces of the wood strips, and means for cooling the tube.

5. A method of producing a composite wood product having at least two wood layers bonded together along juxtaposed surfaces thereof which comprises heating said wood layers, applying thermosetting glue to at least one of said heated layers along a surface thereof to be juxtapositioned with a surface of the other layer, and then juxtapositioning said layers with the thermosetting glue between said surfaces thereof and applying pressure to bond said layers together.

6. A method of producing a composite wood product having at least two wood layers bonded together along mutually opposed surfaces thereof which comprises heating the surfaces of said layers, cooling thermosetting glue, applying the cooled thermosetting glue to at least one of said heated layers along the surface thereof to be opposed to the surface of the other layer, and immediately thereafter juxtapositioning said layers under pressure with the thermosetting glue therebetween to bond said layers together.

7. A method of producing a composite wood product having at least two wood layers bonded together along juxtaposed surfaces thereof which comprises feeding layer forming wood members toward each other, heating the converging surfaces of said wood members as they are so fed, applying thermosetting glue to at least one of the heated surfaces just before they come together, and immediately thereafter applying pressure to bond the wood layers together.

8. A method of producing a composite wood product having at least two wood layers bonded together along juxtaposed surfaces thereof which comprises feeding layer forming wood members toward each other, heating the converging surfaces of said wood members as they are so fed, cooling thermosetting glue, applying the cooled thermosetting glue to at least one of the heated surfaces just before they come together, and immediately thereafter applying pressure to bond the wood layers together.

9. Apparatus for manufacturing a laminated composite wood product, comprising means for feeding wood laminations along a path, means for heating said laminations along said path, means beyond said heating means for applying thermosetting glue to a surface of at least one of the heated laminations, and means along said path beyond said glue applying means for juxtapositioning and pressing said heated laminations together with the thermosetting glue therebetween to bond said laminations.

10. Apparatus for manufacturing a laminated wood product comprising means for feeding wood laminations along at least two converging paths to a bonding area, heating means along said paths in advance of said bonding area for heating said laminations as they pass along said paths toward said bonding area, thermosetting glue applying means adjacent to said paths and intermediate said heating means and said bonding area for applying thermosetting glue to at least one of said laminations, and pressure means at said bonding area for pressing said laminations together with the thermosetting glue therebetween.

11. Apparatus for manufacturing a laminated wood product, comprising means for feeding wood laminations along converging paths to a bonding area, heating means along said paths in advance of said bonding area for heating the surfaces of said laminations to be bonded as they pass along said paths toward said bonding area, thermosetting glue applying means including cooling means intermediate said heating means and said bonding area for applying cool thermosetting glue to at least one of said laminations, and pressure means at said bonding area for pressing said laminations together with the thermosetting glue therebetween and bonding said laminations.

12. A method of producing a composite wood product having at least two layers bonded together along juxtaposed surfaces thereof which comprises heating the surfaces of said layers to be juxtaposed and bonded, feeding thermosetting glue under pressure and applying the glue thus fed to at least one of said heated surfaces, juxtapositioning said layers with the glue between said heated surfaces thereof, and then applying pressure to bond said layers together.

13. A method of producing a composite wood product having at least two layers bonded together along juxtaposed surfaces thereof which comprises advancing said layers, heating during such advance the surfaces of said layers to be juxtaposed and bonded, feeding thermosetting glue under pressure and applying the glue thus fed onto at least one of said heated layers during such advance along a surface thereof to be juxtapositioned with a surface of the other layer, juxtapositioning the advancing layers with the glue between said heated surfaces thereof, and then applying pressure to bond said layers together.

14. A method of producing a composite wood product having at least two layers bonded together along juxtaposed surfaces thereof which comprises exposing said surfaces directly to a source of heat and thereby heating said surfaces, applying thermosetting glue to at least one of the surfaces thus heated, and then juxtaposing said surfaces and applying pressure to bond the layers together.

15. A method of producing a composite wood product having at least two wood layers bonded together along juxtaposed surfaces thereof which comprises heating a hard and a soft layer of wood, applying thermosetting glue to at least one of said heated layers along a surface thereof to be juxtapositioned with a surface of the other layer, juxtapositioning said layers with the glue between said surfaces thereof, and then applying pressure to said layers to bond them together.

16. A method of producing a composite wood product having at least two layers bonded together along juxtaposed surfaces thereof which comprises feeding layer forming members at least one of which is hard wood toward each other, directly heating the converging surfaces of said layer members as they are so fed, applying thermosetting glue to at least one of the heated surfaces just before they come together, and then applying pressure to bond the layers together.

17. Apparatus for manufacturing a composite wood product having at least two layers comprising means for advancing along a path at least two layers to be bonded together, means for heating the surfaces of said layers to be juxtaposed, means for feeding thermosetting glue under pressure and applying said glue to at least one of said heated surfaces and including a perforated hollow tubular member extending transversely of said path beyond said heating means, and means along said path beyond said glue applying means for juxtaposing and pressing said heated layers together with the glue therebetween.

18. Apparatus for manufacturing a composite wood product having at least two layers, comprising means for feeding said layers along converging paths to a bonding area, means in advance of said bonding area for heating said layers as they pass along said paths toward said bonding area, means for feeding thermosetting glue under pressure and applying the same to at least one of said heated layers, said last mentioned means including a hollow tubular member having a plurality of perforations formed therealong, said tubular member extending intermediate and transversely of said converging paths as well as intermediate said heating means and said bonding area, and means at said bonding area for pressing said laminations together with the thermosetting glue therebetween.

References Cited in the file of this patent

UNITED STATES PATENTS

| Number | Name | Date |
|---|---|---|
| 842,411 | Messinger | Jan. 29, 1907 |
| 1,102,036 | Ganter | June 30, 1914 |
| 1,778,333 | Neumann | Oct. 14, 1930 |
| 1,869,957 | Dike | Aug. 2, 1932 |
| 2,038,510 | Goff | Apr. 21, 1936 |
| 2,187,672 | Wedberg | Jan. 16, 1940 |
| 2,191,070 | Cone | Feb. 20, 1940 |
| 2,231,457 | Stephen | Feb. 11, 1941 |
| 2,261,264 | Luty | Nov. 4, 1941 |
| 2,280,071 | Hamilton | Apr. 21, 1942 |
| 2,324,628 | Kahr | July 20, 1943 |
| 2,344,488 | Bowling | Mar. 21, 1944 |
| 2,344,722 | Pasquier | Mar. 21, 1944 |
| 2,389,944 | Winkel | Nov. 27, 1945 |
| 2,399,124 | Kahr | Apr. 23, 1946 |
| 2,490,819 | Lambert et al. | Dec. 13, 1949 |

FOREIGN PATENTS

| 2,576 | Great Britain | 1883 |